United States Patent [19]

Hart

[11] Patent Number: 4,998,756
[45] Date of Patent: Mar. 12, 1991

[54] ADJUSTABLE CONNECTION APPARATUS

[75] Inventor: Brian Hart, Wakefield, England

[73] Assignee: Cooper Industries, Inc., Houston, Tex.

[21] Appl. No.: 443,388

[22] Filed: Nov. 30, 1989

[30] Foreign Application Priority Data

Sep. 14, 1989 [EP] European Pat. Off. ......... 89309339.3

[51] Int. Cl.⁵ ............................................. F16L 27/12
[52] U.S. Cl. .................... 285/298; 285/373; 285/303
[58] Field of Search ............... 285/18, 32, 373, 417, 285/111, 298, 302, 303; 403/341

[56] References Cited

U.S. PATENT DOCUMENTS

| | | | |
|---|---|---|---|
| 1,213,132 | 1/1917 | Peterson | 285/18 |
| 2,818,055 | 12/1957 | Hovde | 285/373 X |
| 3,041,088 | 6/1962 | Brandon, Jr. | 285/373 X |
| 4,008,972 | 2/1977 | Lindberg | 403/341 |
| 4,099,745 | 7/1978 | Cobbs | 403/341 |
| 4,175,405 | 11/1979 | Smith et al. | 403/341 X |
| 4,265,471 | 5/1981 | Nash | 285/373 X |
| 4,489,472 | 12/1984 | Cabrit et al. | 285/298 X |
| 4,526,241 | 7/1985 | Anders | 285/303 X |
| 4,603,887 | 8/1986 | Mayfield et al. | 285/32 |
| 4,609,210 | 9/1986 | Torokvei et al. | 285/373 |

FOREIGN PATENT DOCUMENTS 1468326 2/1967 France ............................. 285/303

*Primary Examiner*—Eric K. Nicholson

[57] ABSTRACT

An adjustable connection apparatus for joining tubular members including a first tubular member with a central bore, a counterbore on one end thereof, a flange on the other end thereof and external fine pitch grooves and ridges, a second tubular member with a central bore, a flange on one end thereof, a first reduced external diameter portion on the opposite end for insertion into said counterbore of said first tubular member, a second reduced diameter portion on the end of said first reduced diameter portion with external threads on the end of said second reduced diameter portion and external fin pitch grooves and ridges, clamping elements having internal fine pitch grooves and ridges for gripping engagement with the external grooves and ridges of said tubular members and means for securing the clamping elements together in gripping engagement with the tubular members to secure them into a joint having a preselected length and sealing means between the tubular members.

4 Claims, 3 Drawing Sheets

ADJUSTABLE CONNECTION APPARATUS

BACKGROUND

The present invention relates to an adjustable connection apparatus which has particular application to the connection of retrievable jumper flowlines between a subsea template and a flowline pull-in apparatus which allows the vertical and horizontal runs to be preset and lowered to the subsea location to be hydraulically set by a remotely operated vehicle (ROV).

U. S. Pat. No. 1,213,132 discloses a pipe coupling which includes two half sections and bolts tightening the half sections on the ends of pipes to be joined which pipes are non-rotatable. The pipe ends and the portions of the coupling which engage each pipe end have different threads or engaging surfaces to allow rotation of the coupling after it is securely attached to the pipe ends so that the pipe ends are pulled toward each other. A suitable metal ring or other type packing is suggested between the end surfaces of the pipe ends within the coupling to ensure a sealed relationship of the end surfaces.

U. S. Pat. No. 4,008,972 discloses a tubing connector which is intended to be used to join a tool to a tubing string and includes a split clamp around the exterior of the tubing string and a mandrel within the tubing string and tightening means to provide a tight engagement between the three components. It is suggested that teeth may be on the interior of the clamp or on the exterior of the mandrel (preferably on the interior of the clamp) or both to provide the secure engagement between the clamp and the string.

U. S. Pat. No. 4,175,405 discloses a coupling used between shafts which are transmitting rotary power so that a section of shafting may be removed without having to remove all the shafting to repair only one section. Each shaft is provided with split collars having a groove to receive the shaft key and axially extending openings to receive drive pins which engage the collars or the opposing shaft end to transmit the rotary power. A pair of housing sections clamp the ends together with seals and bearings into an aligned configuration for the transmission of rotary power between the shafts.

U. S. Pat. No. 4,603,887 discloses an adjustable length tubing connection with a first or outer member having a smooth interior and an outwardly extending end flange and a second or inner member having external threads and being slidably movable within the first member and a clamp to engage the first member flange and the second member threads to clamp them together. The clamp is rotatable to adjust the length of the two members.

SUMMARY

An improved adjustable length connection apparatus including a first tubular member having external fine pitch grooves and a second tubular member having external fine pitch grooves, one of said tubular members having an external end recess and the other having an internal end recess allowing said members to be interengaged, a split clamp having internal fine pitch grooves to match with said external fine pitch grooves of said tubular members and means for tightening said split clamp on said tubular members to retain them in their preselected positions relative to each other. Suitable seal means is provided between the exterior of the tubular member positioned within the other tubular member including a primary metal-to-metal seal and a secondary resilient seal.

An object of the present invention is to provide an improved adjustable joint suitable for use in jumper flowlines in a subsea location.

Another object is to provide an improved adjustable connection apparatus for joining tubular members which is adjustable in length and provides a suitable seal between the members on the interior of one member.

A further object is to provide an improved adjustable connection apparatus which when set functions to retain the connected members together without other locking elements.

BRIEF DESCRIPTION OF THE DRAWINGS

These and other objects and advantages of the present invention are hereinafter disclosed and explained with reference to the drawings wherein.

DESCRIPTION OF THE PREFERRED EMBODIMENT

Figure 1:
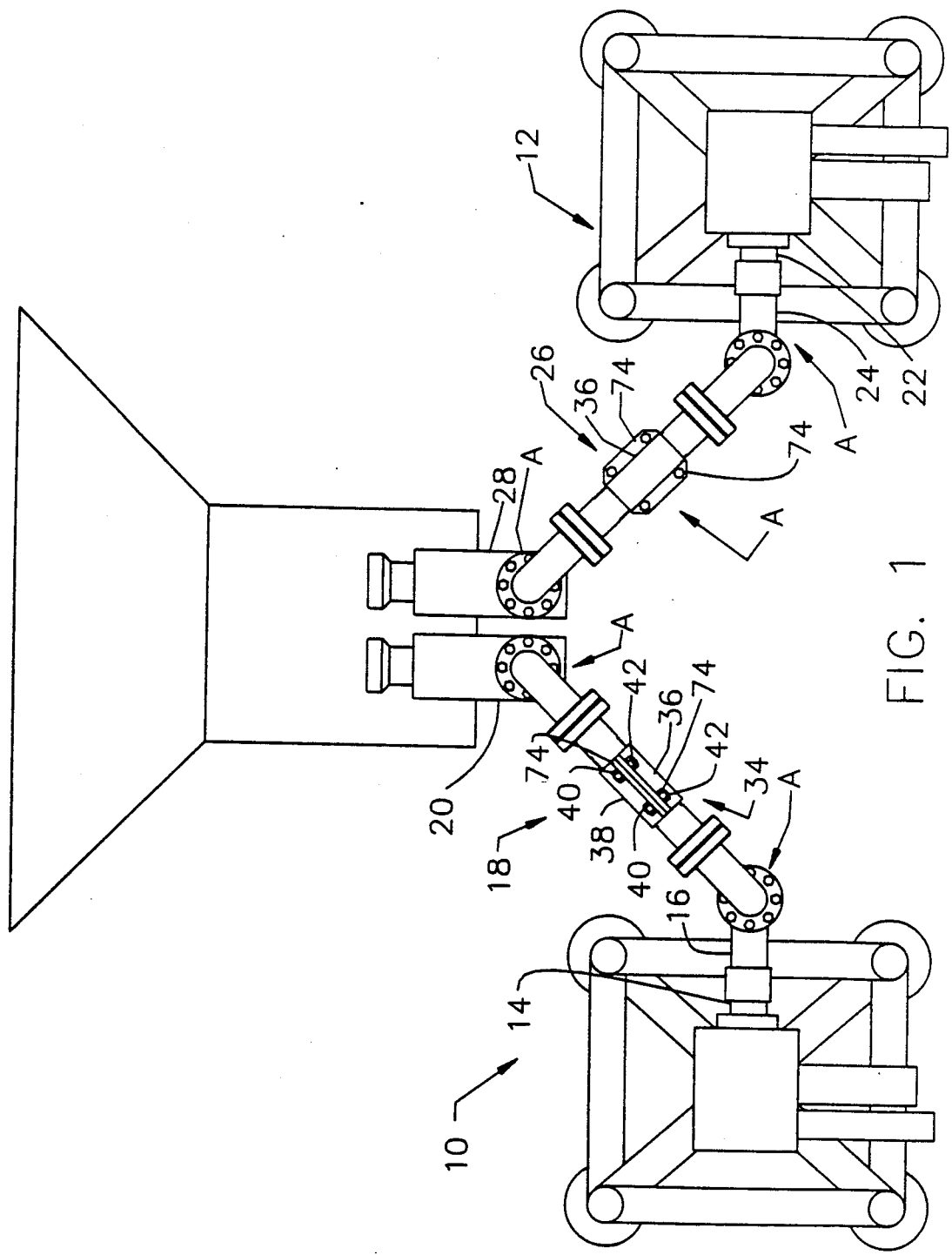
FIG. 1 is a plan view of a pair of subseal templates which are connected to a flow line pull-in apparatus by jumper flow lines including the improved adjustable connection apparatus of the present invention.

Template 10 shown in FIG. 1 is spaced from template 12 and its flowline 14 connects into line 16 from template 10 to jumper flowline 18 which is connected to the flowline pull-in apparatus 20. Similarly, flowline 22 from template 12 is connected to line 24 to jumper flowline 26 which is connected to flowline pull-in apparatus 28. Jumper flowlines 18 and 26 include improved adjustable connection apparatus A of the present invention and are also provided with suitable hydraulic means (not shown) which can be operated by an ROV to provide the connections to the template flowlines 14 and 24 and to the pull-in apparatus 20 and 28.

Figure 2:
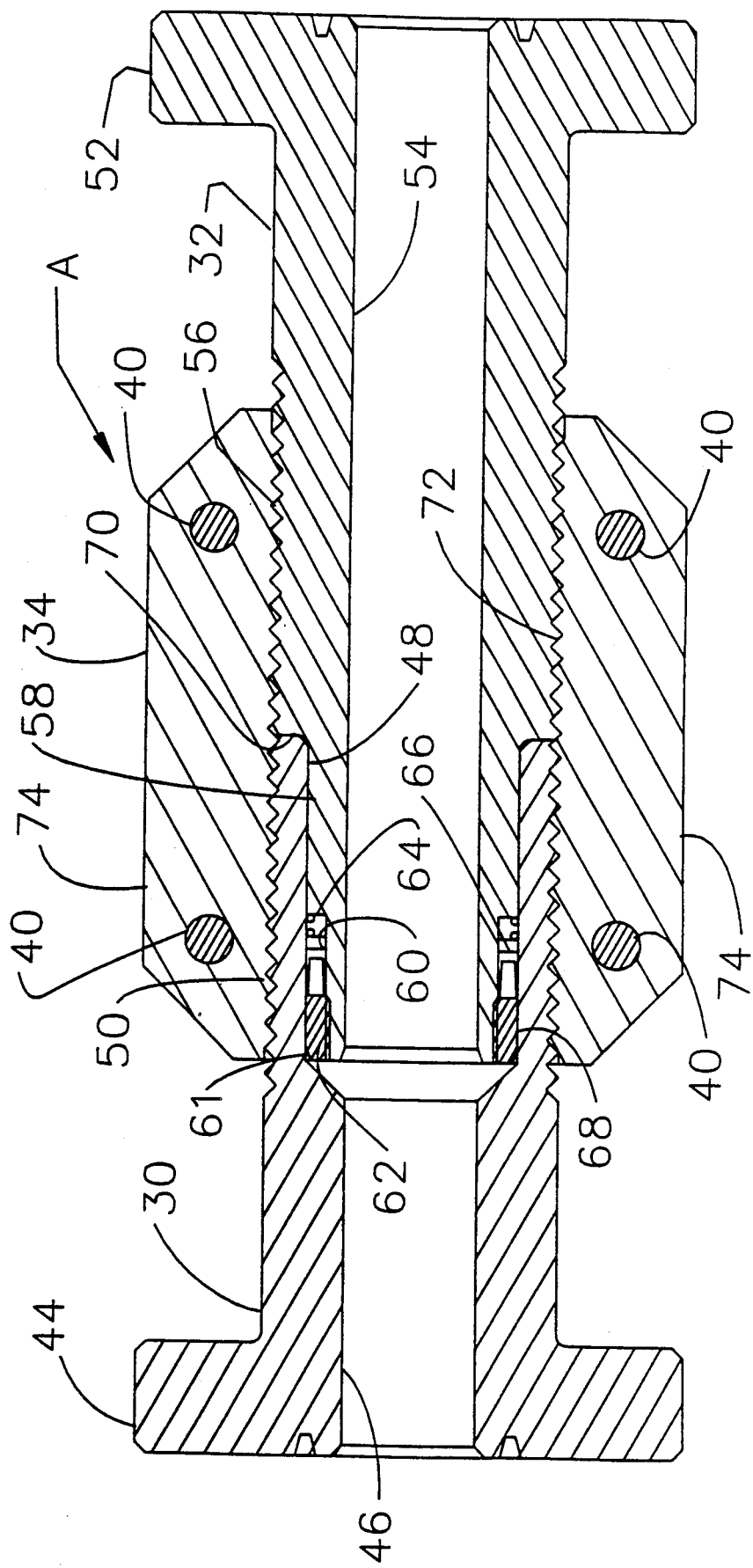
FIG. 2 is a sectional view of the improved adjustable connection apparatus of the present invention in a first short length position.
Figure 3:
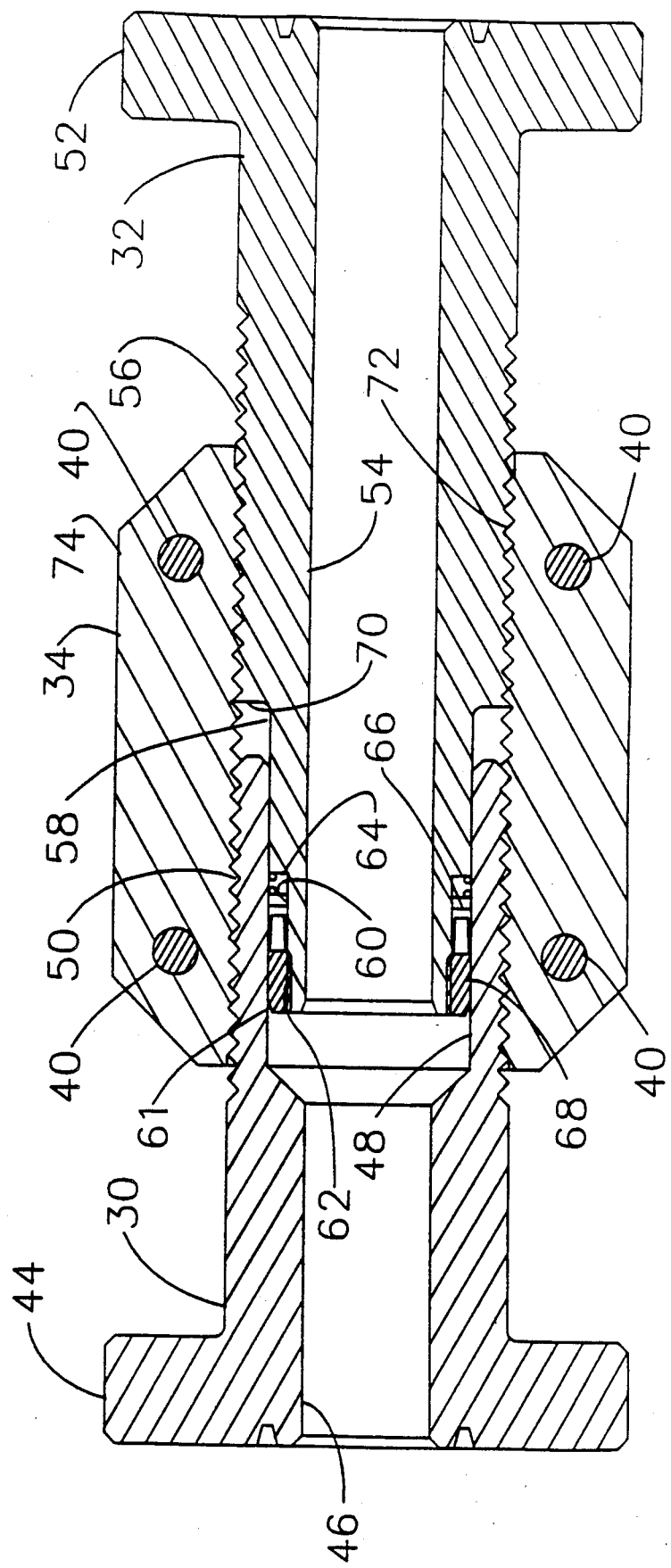
FIG. 3 is a sectional view similar to FIG. 2 showing the improved adjustable apparatus in an extended position in comparison to the apparatus shown in FIG. 2.

As shown in FIGS. 2 and 3, adjustable connection apparatus A includes first tubular member 30, second tubular member 32, split clamp 34 including clamp sections 36 and 38 and fastening means, such as bolts 40 and nuts 42 for securing section 36 and 38 together and for tightening them on the exterior of members 30 and 32 as hereinafter explained. First tubular member 30 includes end flange 44 secured on one end thereof with central bore 46 extending through member 30 and ending in counterbore 48 which extends to the end of member 30. The exterior of member 30 includes a plurality of fine pitch grooves and ridges 50 which may be threads or annular grooves and ridges.

Second tubular member 32 includes end flange 52 secured on one end thereof with central bore 54 extending completely therethrough. The exterior of second tubular member 32 includes a plurality of fine pitch grooves and ridges 56 which may be threads or annular grooves and ridges. Grooves and ridges 56 end in first reduced diameter portion 58 which extends toward the end of member 32 and ends in second reduced diameter portion 60 which in turn ends in external threads 62. First outer reduced diameter portion 58 has a diameter which fits within counterbore 48. Resilient seal 64 is positioned in surrounding relationship to the inner portion of second reduced diameter portion 60 for sealing against the interior of counterbore 48. Metal cup sealing 66 is positioned around second reduced diameter portion 60 between resilient seal 64 and nut 68 is threaded onto external threads 62. Nut 68 is provided to secure seals 64 and 66 on second reduced diameter portion 60 and has an external chamfer to allow easy entry with counterbore 48 of first tubular member 30. First reduced diameter portion 58 defines shoulder 70 which forms a stop limiting the entry of the outer end of second tubular member 32 into counterbore 58 of first tubular member 30.

Clamp sections 36 and 38 include internal grooves and ridges 72 which are mated for engagement with grooves and ridges 50 and 56 on the exterior of tubular members 30 and 32 and also include axially extending flanges 74 with bolts 40 extending through openings 76 therein. Thus, when bolts 40 and nuts 42 are tightened, clamp sections 36 and 38 are brought in tight engagement with the exterior grooved surfaces of member 30 and 32 to secure and retain them in their desired position.

As shown in FIG. 2 members 30 and 32 are telescoped within one another as far as possible so that the end of member 30 engages the stop shoulder 70 on member 32. When it is desired to have the joint of members 30 and 32 be longer it is only necessary to position member 32 in a position which is not totally within counterbore 48 of member 30 as shown in FIG. 3. With members 30 and 32 in their desired positions so that the joint is as long as desired, clamp sections 36 and 38 are tightened thereon and the joint established thereby will have the desired length without sacrificing the integrity of the flowline or having problems with further relative movement of the members.

In some applications, it may be desirable to have connection apparatus A infinitely adjustable rather incrementally. In those situations, it may be desirable to make the grooves and ridge fine lead threads.

What is claimed is:

1. An adjustable length connection apparatus comprising
    a first tubular member having a central bore, a counterbore extending axially therein for a preselected distance at one end thereof, means for connecting the first tubular member into a flowline at the opposite end from said one end and external grooves and ridges,
    a second tubular member having a central bore, a first reduced outer diameter at one end thereof and a second reduced outer diameter extending from the end of said first reduced outer diameter and having a diameter smaller than the diameter of said counterbore of said first tubular member, means for connecting the second tubular member into a flowline at the opposite end from said one end and external grooves and ridges,
    a pair of mating clamping sections having internal grooves and ridges for mating with the external grooves and ridges on said first and second tubular members and means for joining the clamping sections into tight engagement with the exterior of said first and second tubular members, and
    sealing means positioned between the exterior of said first reduced diameter of said second tubular member and the interior of said counterbore of the first tubular member.

2. An adjustable length connection apparatus according to claim 1 wherein
    the grooves and ridges of said tubular members and said clamping sections have a relatively fine pitch.

3. An adjustable length connection apparatus according to claim 1 including
    a nut threaded on the end of said first reduced outer diameter of second tubular member to retain said sealing means thereon.

4. An adjustable length connection apparatus according to claim 1 wherein said sealing means includes
    a resilient sealing ring, and
    a metal cup sealing ring.

* * * * *